United States Patent [19]

You et al.

[11] Patent Number: 5,102,460

[45] Date of Patent: Apr. 7, 1992

[54] VAPORIZABLE SOLID INK COMPOSITION FOR THERMAL INK-JET PRINTING

[75] Inventors: Young S. You, Los Altos; John D. Meyer, Tracy, both of Calif.

[73] Assignee: Hewlett-Packard Company, Palo Alto, Calif.

[21] Appl. No.: 597,288

[22] Filed: Oct. 15, 1990

Related U.S. Application Data

[63] Continuation of Ser. No. 332,242, Mar. 31, 1989, abandoned.

[51] Int. Cl.⁵ .................... C09D 11/02; C09D 11/06; C09D 11/12
[52] U.S. Cl. ...................................... 106/27; 106/30; 106/272; 106/266
[58] Field of Search ...................... 106/27, 31, 30, 272, 106/266

[56] References Cited

U.S. PATENT DOCUMENTS

| | | | |
|---|---|---|---|
| 4,066,789 | 1/1978 | Mores et al. | 106/31 |
| 4,361,843 | 11/1982 | Cooke et al. | 106/27 |
| 4,390,369 | 6/1983 | Merritt et al. | 106/31 |
| 4,484,948 | 11/1984 | Merritt et al. | 106/31 |
| 4,490,728 | 12/1984 | Vaught et al. | 346/1.1 |
| 4,490,731 | 12/1984 | Vaught | 106/31 |
| 4,659,383 | 4/1987 | Lin et al. | 106/27 |
| 4,758,276 | 7/1988 | Lin et al. | 106/27 |
| 4,776,887 | 10/1988 | Kuroda et al. | 106/31 |
| 4,793,264 | 12/1988 | Lin et al. | 106/27 |
| 4,851,045 | 7/1989 | Taniguchi | 106/31 |

Primary Examiner—William R. Dixon, Jr.
Assistant Examiner—Helene Klemanski

[57] ABSTRACT

An ink jet ink including a waxy carrier that is solid at 25° C. and liquid at the operating temperature of an ink jet nozzle and a driver having a critical pressure greater than 10 atmospheres, the carrier and driver being miscible in liquid phase.

12 Claims, No Drawings

VAPORIZABLE SOLID INK COMPOSITION FOR THERMAL INK-JET PRINTING

This is a continuation of copending application Ser. No. 07/332,242 filed on 03/31/89, now abandoned.

TECHNICAL FIELD

This invention is related to the field of ink-jet compositions, particularly solid inks, which are used in thermal ink-jet types of ink-jet printers.

BACKGROUND ART

Liquid ink has been used in many types of ink-jet printers of which the major categories are "Drop-On-Demand" ink-jet and "Continuous" ink-jet. For Drop-On-Demand ink-jet, ink is normally stored in a reservoir and delivered by capillary action to a nozzle in the print head of the printer. A means exists to force a single drop of ink out of the nozzle whenever it is needed to print a single spot on the printed medium (for example, paper). For Continuous ink-jet, ink is forced out of the nozzle in the form of a jet of ink which is unstable and subsequently breaks up into a steady stream of droplets. The trajectory of each drop is controlled typically by either electrostatic or magnetic forces. The drop can be directed either to a catcher for recycling through the main ink system or can be directed to the printed medium to form a printed spot.

The major problems with liquid ink-jet ink are (i) media dependent print quality, (ii) poor reliability, (iii) poor waterfastness, and (iv) a long drying (set) time for the printed ink. The print quality usually depends on the type of paper used, which also has an effect on the drying time and on waterfastness. Although water-based ink has been widely used, it exhibits poor waterfastness. Also, in order to prevent the ink from drying in the jet, high concentrations of humectant such as diethylene glycol have been used. This leads to a long drying (set) time for the print on the medium and poor print quality. The above mentioned factors are interrelated and trade-offs must be made. It is very difficult to satisfy all the conditions outlined above that make for an excellent ink-jet ink.

One method of solving several of the above mentioned problems is to use a phase change or hot melt ink. The ink is normally solid at room temperature. When the ink is heated the ink melts to form a low viscosity fluid which can be ejected as droplets. Most of the hot melt inks reported so far above have involved one phase change, that is, from solid at room temperature to liquid at operating temperature.

Hot melt ink was orginally used by Berry et al. (U.S. Pat. No. 3,653,932, April, 1972) in electrostatically controlled continuous ink-jet printing. The ink was comprised of a waxy component which is solid at room temperature, and the term used by Berry et al., "hot melt" ink, " . . . defines ink in a solid phase at room temperature and in a fluid phase at the operating temperature, which is above the melting temperature of the waxy material." The hot-melt ink was used in the conventional Drop-On-Demand ink-jet printing ejected by a pressure pulse from a piezoelectric crystal (U.S. Pat. No. 4,484,948). In both Continuous ink-jet and Drop-On-Demand ink-jet printing only one phase change is required.

Vaught, U.S. Pat. No. 4,490,731, discloses a solid ink composition having a low critical temperature so as to be suitable for use in thermal ink jet printers. In Vaught, a portion of the solid ink is melted by the apparatus disclosed therein so as to provide for a liquid composition suitable for use in such thermal printers.

DISCLOSURE OF INVENTION

The present invention is an ink-jet composition that overcomes or greatly mitigates the problems associated with liquid inks. The ink of this invention is concerned with a vaporizable hot melt ink or vaporizable solid ink for thermal ink-jet printing technology, which uses a thermally induced vapor bubble as a driving force to eject ink drops out of nozzle. However, in accordance with the invention only a portion of the ink within the print head need undergo these two phase transformations.

It is understood that some of the ink may remain a solid until a later time when there is a need to liquify it for subsequent ejection from the print head in the form of drops. In addition, only a small part of the liquified ink needs to be vaporized to form the bubble which provides the force for ejecting some of the remaining liquid ink from the print head. Also, preferred embodiments of the invention provide special requirements on the viscosity at the melting temperature and on the critical pressure of all or only certain components of the ink. Therefore, solid ink for thermal ink-jet printing comprises three components, namely, a carrier, a driver and a colorant. The ink of this invention usually includes additives to give it desirable properties.

The term "vehicle" defines a combination of all the components involved in solid ink except the colorant. The carrier is a waxy or plastic material which is a solid at 25° C. and carries the colorants. The driver is a bubble-forming substance, which can provide enough driving force to eject ink drops from the print head or nozzle. The colorant can be dye or pigment, which produces the visible printed images on the medium.

The additives are any substances which can enhance the ink with regard to (i) improved solubility of other components, (ii) improved print quality, (iii) improved adhesion of the ink to the media, and (iv) control of wetting characteristics, which may be related to such properties as surface tension and viscosity, among other properties.

Compounds that form the carrier or the driver may also function as additives. Dodecyl alcohol may be an additive to improve the ability of the ink to wet the medium and it may also act as a driver. Octadecanol and stearic acid may be separate additives to improve adhesion or they may act as additives and form all or part of the carrier. Solid ink for thermal ink-jet printing requires special properties for it to suitably undergo two phase transformations. The solid inks reported to date in the literature for drop-on-demand and continuous ink-jet do not work for thermal ink-jet technology.

The carrier of this invention is an organic material which is solid at 25° C. The carrier must also be liquid at the operating temperature of the printing jet. Because the organic carriers which are useful for this invention may not have sharply defined melting points, in this specification, the term "liquid" as applied to the carriers shall include the carriers in a condition in which they can flow through a printing jet. The carrier should be a material that does not introduce other problems into the ink composition. For example, the carrier should be stable at the temperature of the printing process, it should not chemically react with those portions of the structure that it contacts nor should it crust in the ink jets and it should not be poisonous or otherwise noxious. The carrier may be a mixture of materials.

The driver is capable of forming a vapor bubble in a manner known for thermal ink-jet printing and should provide enough force to eject drops of melted ink. The driver must be miscible with the carrier and compatible with other ink components in all proportions, so that the combination of the carrier and the driver is a single phase.

(A) When the Carrier and the Driver are the Same

In one embodiment of the invention the driver and the carrier are the same material. Specifically, a single material or mixture of materials may perform the function of the driver and of the carrier. Only those carriers that have a critical pressure greater that 10 atmospheres may be used both as a driver and as a carrier. Certain fatty acids, long chain alcohols and fatty acid esters may perform as a single component vehicle and driver.

Preferred fatty acids that can perform both functions include stearic acid, palmitic acid, myristic acid, behenic acid, and tridecanoic acid. Long chain alcohols that can perform both functions include octadecanol, hexadecanol and tetradecanol. Fatty acid esters that can perform both functions include monoethylstearate, diethylstearate and mono-ethylpalmitate. In the case of a mixture of materials that perform both functions, at least one component must have a critical pressure of at least 10 atmospheres and a low enough boiling temperature to form vapor bubbles at the conditions in the ink head. Because systems in which the driver and the carrier are the same material have relatively high molecular weights, they usually have relatively low critical pressures and low thermal diffusivity.

When using an ink-jet ink wherein the carrier and the driver are the same material, it is preferred to produce the vapor bubble with a multi-part electrical pulse, with: (a) the first pulse or pulses (precursor pulses) heating the driver without nucleating a bubble, and (b) the final pulse or pulses (kicker pulses) quickly heating the driver to a temperature near its superheat limit, a temperature at which molecular movement is so great that the probability of homogeneous nucleation of a bubble within a fluid approaches unity.

The multi-phase heating may be accomplished with two pulses or a train of three or more pulses. This multi-pulse heating system causes rapid nucleation and explosive bubble formation to drive the ink through the jet. Control of the timing of the nucleation pulses and the rate of ink flow through the jet produces ink drops that are the correct size to produce high quality print on the medium. Vaporization of the driver occurs within a drop ejection channel in the printing head and behind that portion of the vehicle that is to be expelled from the ink-jet by the expansion of the bubble. The temperature of the ink in the ejection channel is such that the ink is liquid when ejected from the nozzle.

(B) When the Carrier and the Driver are not the Same

A preferred embodiment of the invention is a system including a colorant with a carrier and a separate low-boiling solvent for the vehicle. In this preferred embodiment, the low-boiling solvent is the driver. Low-boiling solvents usually have very high critical pressures and they can be highly superheated so that nucleation occurs rapidly to efficiently drive the vehicle from the jets. When a low-boiling solvent is employed as the driver there is a great deal of latitude in selection of the carrier. It may be any waxy or plastic material that is solid at 25° C. irrespective of its critical pressure.

Suitable solvent drivers with low boiling points may be selected from alcohols, polyols, glycol ethers, and even mixtures of the above with water, as long as if there is insufficient water to form a separate phase. Particularly suitable drivers include propyl alcohol, hexyl alcohol, octyl alcohol, and benzyl alcohol, among others. Preferred polyols include ethylene glycol, propylene glycol, 1,2-propanediol, 1,3-propanediols, and 2,3-butanediol. Glycol ethers that may be employed include diethylene glycol, ethylene glycol monomethyl ether, and propylene glycol monomethyl ether, among others.

In a particularly preferred embodiment of the invention, the ink is constituted to contain at least 5% by weight of a volatile solvent driver and the total ink composition has a viscosity not greater than 15 centipoise and a surface tension less that 30 dynes per centimeter at 90° C. The particularly preferred composition has a viscosity of less than 10 centipoise, a surface tension of about 20 dynes per centimeter and melting temperature of about 90° C.

Inks constituted with these properties have a uniform spreading ability to carry the normally solid vehicle into paper, yet the solvent evaporates rapidly to leave a solid ink embedded in the paper and not extending above its surface. The composition of the particularly preferred inks can be designed to produce controlled, uniform spreading onto the paper without causing feathering.

The ink-jet ink of this invention avoids the problems of prior inks because it is solid or plastic or slurry at critical times in the printing procedure. At the time the ink of this invention strikes the medium, the vehicle droplets quickly penetrate the paper and any solvent in the composition rapidly flashes off to leave a sharp, optically dense mark on the paper. The mark drys rapidly and is resistant to smearing.

BEST MODE FOR CARRYING OUT THE INVENTION DEFINED BY THE CLAIMS

The following examples narrowly illustrate a specific number of ink-jet inks made and used according to the invention which is much more broadly defined by the appended claims.

EXAMPLE 1

|  | Composition | Weight % |
|---|---|---|
| Carrier: | Stearic acid | 55 |
| Driver: | Neopentyl alcohol | 15 |
|  | 2,3-Butanediol | 15 |
| Colorant: dye | Morfast 101 (liquid) (Morton Thiokol) | 15 |

The ink of Example 1 was used in a conventional bubble driver ink jet printer in which electric resistance heaters vaporized the driver. The heaters were operated at a resistance of about 26 ohms and used a single stage heating pulse of 450 mA (milliamperes) for a period of 6 microsec (microseconds). The ink produced a sharp, black image on paper which was non-smearing and water resistant.

EXAMPLE 2

|  | Composition | Weight % |
| --- | --- | --- |
| Carrier: | 1-octadecanol | 55 |
| Driver: | Neopentyl alcohol | 15 |
|  | 2,3-butanediol | 15 |
| Colorant: dye | Morfast 101 (liquid) (Morton Thiokol) | 15 |

The ink of Example 2 was also used in the printer of Example 1 in a one pulse printing process at the same conditions of Example 1. The ink of Example 2 also produced a sharp, black image on paper which was non-smearing and water resistant.

EXAMPLE 3

|  | Composition | Weight % |
| --- | --- | --- |
| Carrier: | Stearic Acid | 55 |
| Driver: | Dodecanoic Acid | 30 |
| Colorant: dye | Morfast 101 (Morton Thiokol) | 15 |

The ink of Example 3 employed a driver that was not highly volatile. To obtain rapid nucleation of the solvent bubble a multipulse heating procedure was employed. The heaters were electric resistance heaters having a resistance of about 26 ohms. The precursor pulse of 380 mA had a duration of 80 microsec and the kicker pulse of 520 mA had a duration of 5 microsec. This procedure produced a sharp, black image on paper which was non-smearing and water resistant.

EXAMPLE 4

|  | Composition | Weight % |
| --- | --- | --- |
| Carrier: | Tetradecunoic Acid | 85 |
| Colorant: dye | Morfast 101 (Morton Thiokol) | 15 |

Example 4 is an example of an ink in which the carrier and the driver are the same compound. The ink of Example 4 also required multiple electric heating pulses to vaporize the driver and drive the ink through the jets. The precursor pulses numbered about 13 each having a duration of about 8 microseconds at 12 volts and 450 mA. There was 2 microseconds dead time between pulses. The kicker pulses numbered one or two and their shape was identical to the precursor pulses. The heater resistance was 26 ohms. The ink of Example 4 produced a sharp, black image on paper, which was non-smearing and water resistant.

The critical pressures (atm) of the cited waxes and related chemicals are as follows: (a) 16.7 atm for tetradecanoic acid, (b) 13.4 for stearic acid, (c) 13.8 for 1-octadecanol, (d) 11.0 for 1-eicosanol (C-20), and (e) 11.1–11.6 for C-22–C-24 acid.

CLAIMS DEFINE THE INVENTION

The foregoing specific examples having narrow scope illustrate particular systems which are at present considered by the inventors to be the best modes of practicing the claimed invention. However, it is to be understood that it is the following claims that actually (a) define the invention and (b) establish the broad scope of the invention.

The invention claimed is:

1. A single phase ink-jet ink particularly well suited for an ink jet printer using at least one heating pulse for heating the ink and thereby propelling it from the print head of the ink jet printer toward a print medium to form sharp, optically dense marks thereon, the ink comprising:
    (a) a carrier that is at least 50% by weight of said ink, that is solid at 25° C. and liquid at the operating temperature of an ink jet;
    (b) a driver that is at least 5% by weight of said ink and that is vaporizable by said heating pulse for propelling said ink toward said print medium, said driver being miscible with said carrier and having a minimum critical pressure of 10 atmospheres wherein said driver is selected from the group consisting of ethylene glycol, propylene glycol, 1,2-propanediol, 1,3-propanediol, 2,3-butanediol, diethylene glycol, ethylene glycol monomethyl ether, propylene glycol monomethyl ether, and mixtures of such drivers with water provided that there is insufficient water to cause phase separation; and
    further wherein said driver and carrier are selected so as to provide for an ink composition which is a solid at 25° C. and liquid at the operating temperature of the print head and which has a viscosity not greater than 15 centipoise and a surface tension of less than 30 dynes per centimeter at 90° C.; and
    (c) a colorant.

2. The ink of claim 1 wherein said carrier is a mixture of waxy compounds.

3. The ink of claim 1 wherein said driver is a solvent for said carrier and is more volatile than said carrier.

4. The ink of claim 3 wherein said driver has a minimum critical pressure of 30 atmospheres.

5. The ink of claim 1 wherein said driver contains water.

6. The ink of claim 1 having a viscosity of about 5 centipoise at 90° C. and a surface tension of about 20 dynes per centimeter.

7. The ink of claim 1 including an additive to control adhesion of ink to a medium.

8. The ink of claim 7 wherein said additive is octadecanol.

9. The ink of claim 1 including an additive to control the ability of said ink to wet a printing medium.

10. The ink of claim 9 wherein said additive is dodecyl alcohol.

11. The ink of claim 1 or 3 wherein said carrier comprises at least 55% by weight of said ink.

12. The ink of claim 1 or 3 wherein said driver comprises at least 20% by weight of said ink.

* * * * *